(12) United States Patent
Chen

(10) Patent No.: US 7,047,356 B2
(45) Date of Patent: May 16, 2006

(54) STORAGE CONTROLLER WITH THE DISK DRIVE AND THE RAM IN A HYBRID ARCHITECTURE

(76) Inventor: Jack Yajie Chen, 1562 Hamlet Dr., Troy, MI (US) 48084

( * ) Notice: Subject to any disclaimer, the term of this patent is extended or adjusted under 35 U.S.C. 154(b) by 0 days.

(21) Appl. No.: 10/431,301

(22) Filed: May 6, 2003

(65) Prior Publication Data
US 2003/0196031 A1  Oct. 16, 2003

Related U.S. Application Data

(63) Continuation-in-part of application No. 09/699,811, filed on Oct. 30, 2000, now abandoned.

(51) Int. Cl.
*G06F 12/00* (2006.01)
(52) U.S. Cl. ...................... 711/113; 711/154
(58) Field of Classification Search ............... 711/104, 711/111, 112, 161, 162, 170, 103, 154, 113; 360/69; 714/6–22, 24; 713/340, 300, 320; 365/229
See application file for complete search history.

(56) References Cited

U.S. PATENT DOCUMENTS

| | | | | |
|---|---|---|---|---|
| 5,799,200 A | * | 8/1998 | Brant et al. ............... | 711/100 |
| 5,978,924 A | * | 11/1999 | Ahn .......................... | 713/323 |
| 6,065,100 A | * | 5/2000 | Schafer et al. ............ | 711/137 |
| 6,101,574 A | * | 8/2000 | Kumasawa et al. ....... | 711/113 |
| 6,314,528 B1 | * | 11/2001 | Kim ........................... | 714/24 |
| 6,336,174 B1 | * | 1/2002 | Li et al. .................... | 711/162 |
| 6,604,171 B1 | * | 8/2003 | Sade ......................... | 711/113 |
| 2002/0101677 A1 | * | 8/2002 | Dykes et al. ............. | 711/162 |

* cited by examiner

*Primary Examiner*—Pierre-Michel Bataille
(74) *Attorney, Agent, or Firm*—Bliss McGlynn, P.C.

(57) ABSTRACT

A method to combine disk drive's inexpensive large capacity and RAM's fast access speed to accelerate computer system's booting speed and application execution speed. Some of the most recently used data will be permanently stored in a large RAM storage with a power source. A controller unit is designed to manage the interface between the RAM storage, disk drive and the computer storage device interface.

3 Claims, 5 Drawing Sheets

| RAM ADDRESS | DISK ADDRESS | ACCESS SEQUENCE | MODIFIED |
|---|---|---|---|
| 10043 | 110444 | 10334 | YES |
| 10044 | 110445 | 10335 | NO |
| 10045 | 110144 | 10336 | NO |
| 10046 | 110145 | 10337 | NO |

FIG. 5

STORAGE CONTROLLER WITH THE DISK DRIVE AND THE RAM IN A HYBRID ARCHITECTURE

This is a continuation-in-part of pending U.S. patent application Ser. No. 09/699,811 filed Oct. 30, 2000 Now Abandoned.

CROSS-REFERENCE TO RELATED APPLICATIONS

U.S. Pat. No. 5,923,829 Jul. 13, 1999 Ishii
U.S. Pat. No. 6,016,263 Jan. 18, 2000 Chen
U.S. Pat. No. 6,070,226 May 30, 2000 Freeman
U.S. Pat. No. 6,092,149 Jul. 18, 2000 Hicken
U.S. Pat. No. 6,119,211 Sep. 12, 2000 Kaneko
U.S. Pat. No. 5,151,907 Sep. 29, 1992 Robbins The cache memory book/Jim Handy, 1998

FIELD OF THE INVENTION

The present invention relates to an enhancement of a storage device for use with a computer system.

BACKGROUND OF THE INVENTION

Referring now to FIG. 1 a typical computer system 10 is shown. In such a computer system 10, because of the physical limitation of the magnetic media and optical media, the access speed of the disk drive 12 is between 0.004 second to 0.1 second. This time frame represents a much slower rate than that of a Central Processing Unit 11 ("CPU") and the computer system's Random Access Memory 13 ("RAM"), which operates at access times of in several nanoseconds (i.e., $\frac{1}{1,000,000,000}$ of a second). The disk drive 12 is therefore the bottleneck of the computer system 10, as it operates much slower than the CPU 11 and RAM 13. Sophisticated operating systems and applications require more and more disk storage. It takes minutes to load an operating system and the applications.

There are some technologies such as advanced disk caching which address some of these issues, but suffer from certain drawbacks. For example. and without limitation, only accessing continuous large blocks of disk data can take advantage of disk caching. Caching or caches consists of a very small amount of high speed SRAM. The content turn-over is very high (almost 100%). It is therefore not intended to store data permanently. Caching does not reduce initial seek time either since any additional data request will be forward to disk drive, whose speed is limited by mechanical rotation of the disk. Another known software technique such as RAMDisk, which uses software to emulate a disk drive with main RAM, improves the speed of accessing temporary data. However when a computer is powered down, the content of the RAMDisk is distorted. RAMDisk also has a very limited size as it is limited by the amount of main memory.

A RAM Storage device can improve the storage performance significantly. But it is very limited in storage capacity with higher cost and less reliability in the event of battery failure. It requires a special device drive to communicate with the Operating System. Once the RAM storage device is installed in a computer system. It is impossible to remove it or upgrading the computer hardware without losing the data. It cannot be retrofitted into an existing computer system, a new Operating System installation is required.

Although a disk drive contains gigabytes of data, only a small portion of the data is recently used, such as swap file, temporary file, operating system files, e-mail system, office program, internet browser, etc.

SUMMARY OF THE INVENTION

It is therefore the primary objective of the present invention to provide a storage controller to create a hybrid storage with the RAM and the disk drive. This will take advantage of the speed of the RAM for most recently used data and the advantage of reliable, in-expensive and large capacity of a disk drive.

The present invention improves computer system speed by reducing disk drive access time from most recently used data including operating system files, application program files and user data files. The RAM access speed of the present invention ranges from 8 nanoseconds to 70 nanoseconds depending on the type of RAM used. It is about a thousand times faster than the hard disk access speed (4–9 milliseconds). It is about ten thousand times faster than a removable disk like a ZIP disk (29 milliseconds) from Iomega, Inc. It is about hundred thousand times faster than a CD-ROM access speed (200–500 milliseconds).

The present invention does not replace traditional disk drive storage, it is used in conjunction with the traditional disk drive. It enhances and optimizes the performance of the traditional disk drive by integrating a high speed RAM unit into the interface. It also reduces the frequency of disk drive accesses that results in longer usage life, less power consumption and a more reliable disk drive.

The present invention can be applied to existing computer systems with a minimum hardware modification and no software modification. This invention can be retrofitted into existing computer systems without installing any additional device drivers and software. It emulates the disk drive's protocol and sector configuration. Unlike other cache manager software, which require a user to modify the targeted operation system, a hybrid storage device is transparent to any operating system and any program. Since the controller stores data in a form of lowest level sector, it is independent of the file system, which is significantly different from operating system to operating system. Therefore, it can be used in different operating system without modification.

The present invention is very reliable due to the redundancy of storage and battery backup mechanism. The RAM unit can be added without damage the stored data. The battery can be changed without corrupting the stored data.

BRIEF DESCRIPTION OF THE DRAWINGS

FIG. 5 shows a block diagram of RAM data block-access table.

DETAILED DESCRIPTION OF THE INVENTION

Figure 1:
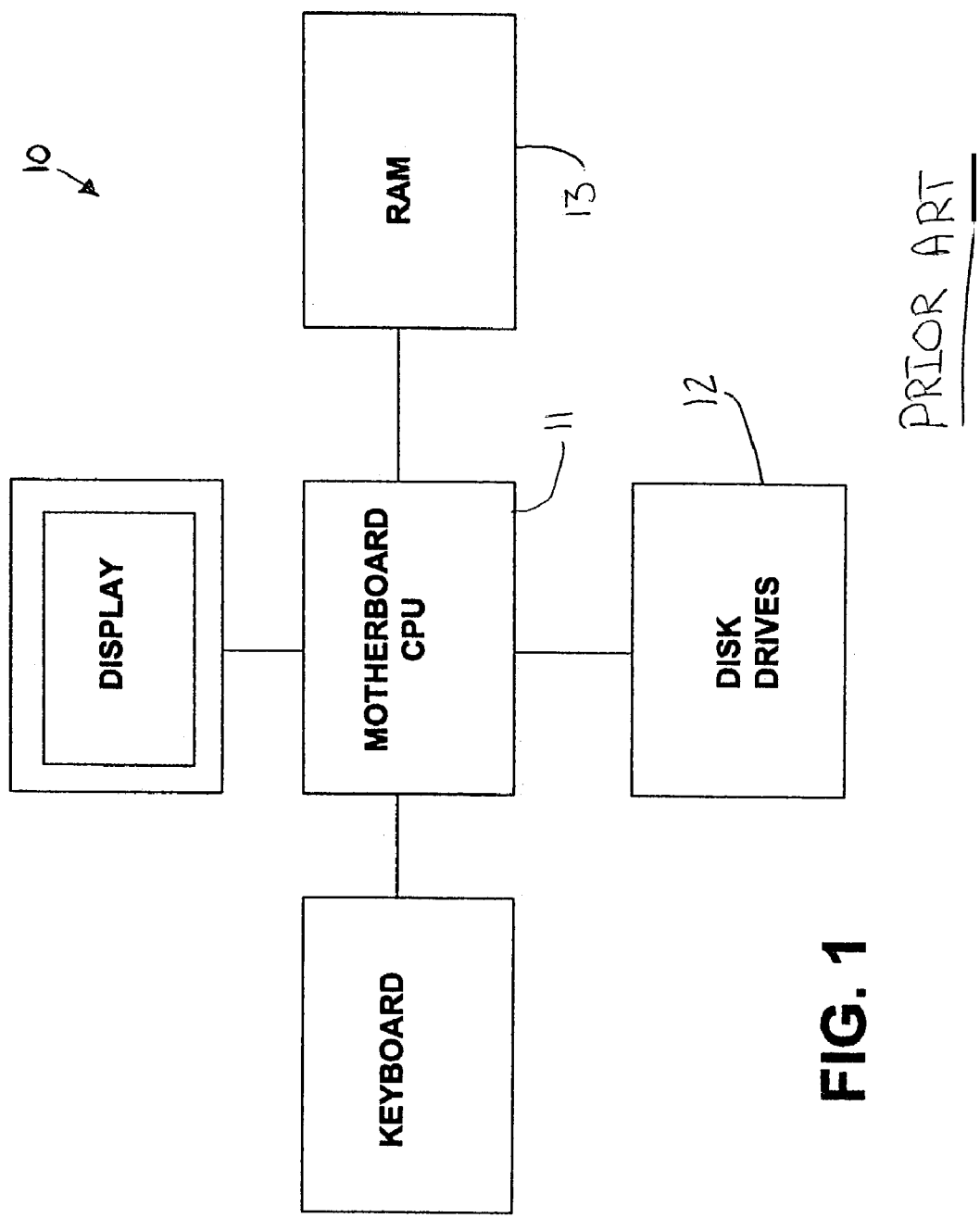
FIG. 1 shows a block diagram of a typical prior art computer system.
Figure 2:
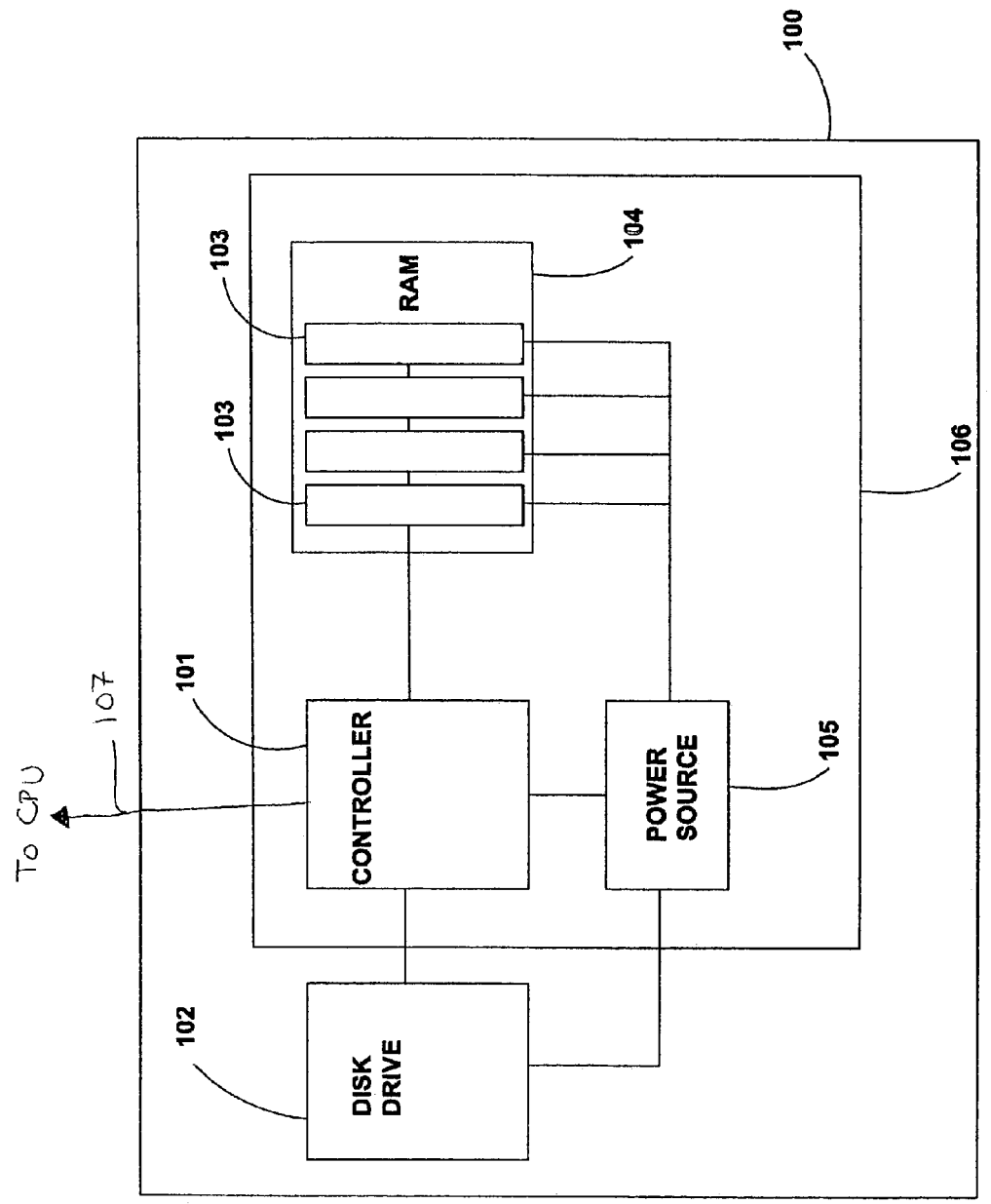
FIG. 2 shows a block diagram of the preferred embodiment of the present invention.
Figure 3:
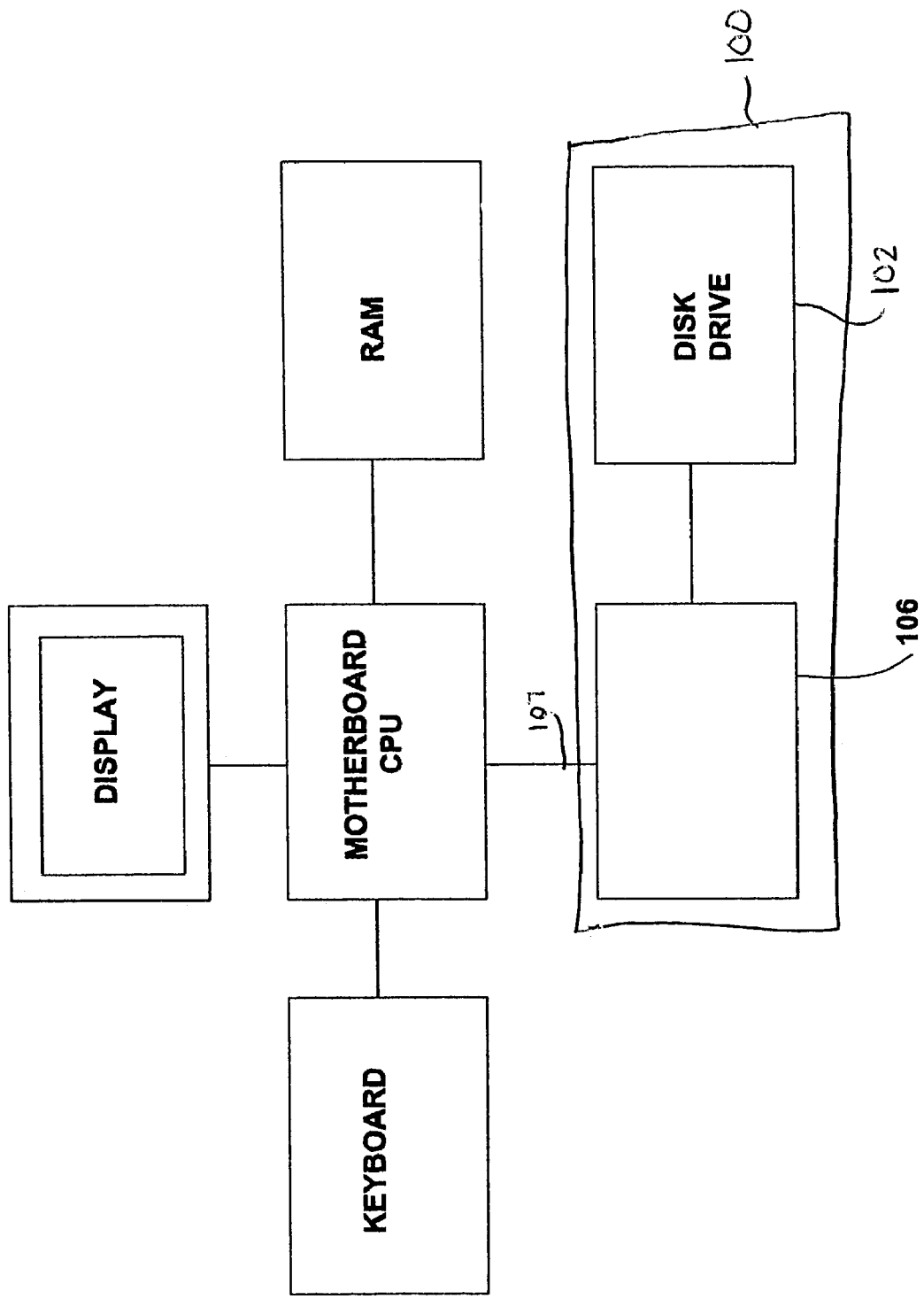
FIG. 3 shows a block diagram of the first embodiment of the present invention in use with a computer.

Referring now to FIGS. 2 and 3, a hybrid storage controller 106 is provided. Hybrid storage controller 106 is formed of a power source 105, a controller 101 and a plurality of separate RAM units 103 (collectively referred to as RAM unit or units 104). In this preferred embodiment of the invention, hybrid storage controller 106 and main memory or disk drive 102 are integrated into the same device 100.

The hybrid storage controller 106 of the present invention comprises is connected to a disk drive 102. The controller 106 manages the data flowing between the computer system 50, the RAM 104 and the disk drive 102. The disk drive 102 is accessed only if the data block that a computer requests is not in the RAM units 104 or when the data block needs to be backed-up to disk drive 102 at a pre-determined period. The present invention significantly reduces the number of "seeks" on the disk drive 102 resulting in faster accessing time and longer disk drive life.

In order to reduce the RAM 104 to disk drive 102 turn over (i.e., to avoid continuous searches or "seeks" for data from disk drive 102), a large amount of RAM 104 is needed within storage controller 106. In the preferred embodiment of the invention, at least two times of the main memory 12, 102 of the main computer system. The RAM 104 stores all the operating system files the current system needs and the virtual memory space that stores operating system and application temporary data. For example and without limitation, currently the average personal computer main memory 12, 102 has about 512 Megabytes of storage space, the controller 106 described in this invention must have at least 1 Gigabytes to take advantage of the hybrid architecture. It should be appreciated that the size or ratio of RAM unit 104 storage capacity to main memory 102 size may vary and that the storage capacity of RAM unit 104 should not be construed to be limited by the size of disc drive or memory 102. In another non-limiting embodiment of the invention, controller 106 continually monitors the RAM 104 to disk drive 10 "turn over" and may transmit a signal to the user (via the motherboard CPU and conventional display assembly) to alert the user of the computer system that additional RAM units 103 may be required to maintain the performance of the system..

Power source 105 is a Direct Current source, which can be a rechargeable battery, a battery or an AC-DC converter. It provides continuous power supply to the controller 101, disk drive 102 and the RAM unit 104.

Controller 101 is a programmable processor connected to external disk drive 102, computer system bus 107, and the RAM unit 104. Controller 101 transfers data between the computer and the RAM units 104 and between the RAM 104 and the disk drive 102. Controller 101 emulates and is fully compatible with a standard disk drive, such as an IDE disk drive, a SCSI disk drive or a Universal Serial bus ("USB") disk drive. The computer system accesses this device exactly like accessing to a standard disk drive.

Controller 101 maintains a RAM data block access table 200, which is best shown in FIG. 5. In this RAM data block access table 200, a sequential number is assigned to the most recently accessed data block. Once the RAM 104 is full of data blocks (i.e., the storage capacity of the RAM 104 is filled with sequentially numbered stored data blocks), controller 101 stores the most recently accessed data block in the RAM 104 and removes the less recently accessed data block from the RAM 104. A special area of the RAM 104 is reserved for the data block that the computer system uses during system startup or booting to enhance the boot performance.

If the content of the data block is changed by the computer system, a modified flag is set to the data block access table 200 by the controller 101 in the RAM 104. The data block with a modified flag is then copied to the data block in the disk drive 102 at a predetermined period instead of each time when the content is changed. This design reduces the frequency of disk drive 102 access while synchronizing the data blocks between the RAM unit 104 and the disk drive 102 effectively. When the computer system is powered down, controller 101 copies all of the data blocks with the modified flags that are stored in RAM unit 104 to the disk drive 102 before shutting down the power of the disk drive. When the computer system is booted, controller 101 checks the integrity of the data in the RAM units 104. If the data block stored in RAM 104 is corrupted due to power source failure or from the addition or removal of the RAM units 103 (i.e., the user of the system adds or removes RAM units 103 to the computer system), controller 101 copies the flagged data from the disk drive 102 into the newly configured (or re-powered) RAM units 104.

Controller 101 may be connected to any standard peripheral interface such IDE interface, SCSI interface, USB interface, or firewire interface.

Each RAM unit 103 can be any standard random access memory such as dynamic random access memory (DRAM), static random access memory (SRAM), synchronous dynamic random access memory (SDRAM) or rambus RAM.

In one non-limiting embodiment of the invention, when the primary source of energy is a battery (not shown) and the controller (either CPU 51 or controller 101) determines that the battery is low on power, the modified data block stored upon RAM units 104 is saved or "backed-up" to the disk drive 102 before the disk drive 102 is powered down. The recently used and system boot data blocks are still in the RAM 104 with a separate power source 105 than the main computer system. The power source 105 only supplies enough power to maintain DRAM in power-down mode. This ensures a very minimum of consumption of energy from power source 105 in this hybrid storage device 106. In case of power source failure, the RAM 104 is refreshed from the disk drive 102 when the main computer system is powered back on.

Referring now to FIG. 5, an area is reserved in the RAM units 104 for a data block access table 200 to map the RAM address 201 into disk drive address 202. An access sequential number 203 is assigned to the item of the data block access table 200 each time the data block is accessed. It should be appreciated that in the preferred embodiment of the invention, the most recently accessed data block has a larger number. The smaller sequential number indicates that a data block has been less recently accessed with respect to data blocks having higher sequential numbers. The less recently accessed data block is discharged from the RAM units 103 when RAM is needed for a newly accessed data block. In order to improve the booting performance, the portion of the data block with the smallest sequential number is always reserved in the RAM units. The sequential number is re-assigned when the computer system is rebooted.

When the content of the data block in RAM unit 104 is modified by the computer system, a modified flag 204 is set for that item in the list. Periodically, the controller 101 saves or backs up the changes in the RAM unit 104 to the disk drive 102. The modified flag 204 is reset once the change is saved in the disk drive.

Figure 4:
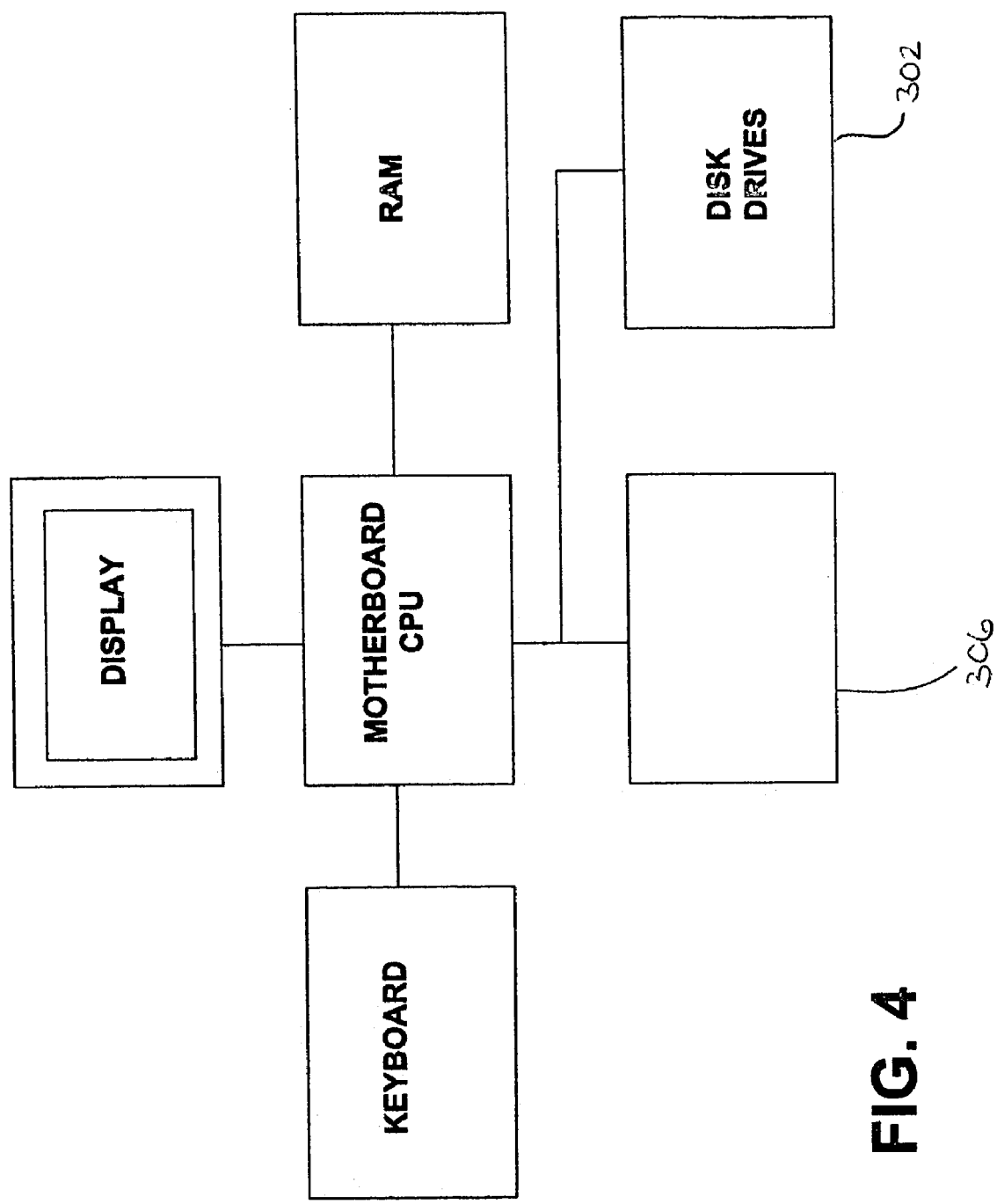
FIG. 4 shows a block diagram of an alternate embodiment of the present invention in use with a computer.

As shown in FIG. 4, a hybrid storage device 306 of an alternate embodiment of the present invention is basically similar to that of the first preferred embodiment described above except that the disk drive 302 is not integrated into the same device (e.g., device 100) as hybrid storage controller 306 and in this non-limiting embodiment, the computer CPU (i.e., the motherboard Central Processing Unit) may directly control the interaction of hybrid storage controller 306 and disk drive 302.

Hybrid storage controller 106 emulates a disk drive's protocol and sector configuration and in this manner, this invention can be retrofitted into existing computer systems without installing any additional device drivers and software. It should be appreciated that the present invention can therefore be applied to existing computer systems with a minimum hardware modification and no software modification.

What is claimed is:

1. A storage assembly comprising:
   a hard disk drive;
   a processing assembly connected to said hard disk drive comprising a power source, a controller, and random access memory, said controller interconnecting said random access memory and said hard disk drive, said power source being connected to said hard disk drive, said controller, and said random access memory, wherein said processing assembly is adapted to receive data from a computer system; and
   wherein said controller manages the data flowing between the computer system, said random access memory, and said hard disk drive, said controller causing the received data to be placed only within said random access memory such that said random access memory contains stored data blocks, said controller continuously monitoring usage of the data resident within said random access memory, said controller accessing said hard disk drive only if a data block that the computer system requests is not in said random access memory and backing-up a data block to said hard disk drive only when the data block has not been accessed from said random access memory for a period of time.

2. A method of storing data, said method comprising the steps of:
   providing a hard disk drive;
   providing a processing assembly having a controller and a random access memory and connecting the processing assembly to the hard disk drive;
   receiving data from a computer system by the processing assembly and placing the data by the controller only within the random access memory such that the random access memory contains stored data blocks;
   continuously monitoring the usage of the data which is resident within the random access memory;
   accessing the hard disk drive only if a data block that computer system requests is not in the random access memory; and
   backing-up a data block to the hard disk drive only when the data block has not been accessed from the random access memory for a period of time.

3. A method of storing data, said method comprising the steps of:
   providing a hard disk drive;
   providing a processing assembly having a power source, a controller, and random access memory;
   connecting the controller to the hard disk drive and the random access memory;
   connecting the power source to the hard disk drive, the controller, and the random access memory;
   receiving data from a computer system by the controller and placing the data by the controller only within the random access memory such that the random access memory contains stored data blocks;
   continuously monitoring the usage of the data which is resident within the random access memory;
   accessing the hard disk drive only if a data block that computer system requests is not in the random access memory; and
   backing-up a data block to the hard disk drive only when the data block has not been accessed from the random access memory for a period of time.

* * * * *